(12) United States Patent
Naruse et al.

(10) Patent No.: US 9,709,341 B2
(45) Date of Patent: Jul. 18, 2017

(54) HEAT EXCHANGER (75) Inventors: Hidekatsu Naruse, Nagoya (JP); Yoichi Kojima, Nagoya (JP); Shinya Otsubo, Nagoya (JP); Masaru Shimazaki, Nagoya (JP); Takeshi Kawashima, Nagoya (JP); Hiroaki Sasaki, Nagoya (JP)

(73) Assignee: RINNAI CORPORATION, Nagoya-shi, Aichi (JP)

( * ) Notice: Subject to any disclaimer, the term of this patent is extended or adjusted under 35 U.S.C. 154(b) by 194 days.

(21) Appl. No.: 13/643,160

(22) PCT Filed: Apr. 26, 2010

(86) PCT No.: PCT/JP2010/057375
§ 371 (c)(1),
(2), (4) Date: Nov. 7, 2012

(87) PCT Pub. No.: WO2011/135650
PCT Pub. Date: Nov. 3, 2011

(65) Prior Publication Data
US 2013/0112384 A1 May 9, 2013

(51) Int. Cl.
*F28F 9/02* (2006.01)
*F24H 8/00* (2006.01)
(Continued)

(52) U.S. Cl.
CPC ............ *F28F 9/02* (2013.01); *F24D 19/0095* (2013.01); *F24H 8/00* (2013.01); *F24H 9/146* (2013.01);
(Continued)

(58) Field of Classification Search
CPC .......... F28F 9/02; F28F 9/0268; F28F 9/0265; F28F 9/0278; F28F 2265/06; F24H 9/0015; F24H 9/16
(Continued)

(56) References Cited

U.S. PATENT DOCUMENTS 406,512 A * 7/1889 Hoppes .......................... 165/114
2,488,623 A * 11/1949 Goeltz ............................. 138/38
(Continued)

OTHER PUBLICATIONS

International Preliminary Report for International Application No. PCT/JP2010/057375 mailed on Nov. 6, 2012.
(Continued)

*Primary Examiner* — Justin Jonaitis
*Assistant Examiner* — Eric Ruppert
(74) *Attorney, Agent, or Firm* — Amin, Turocy & Watson LLP (57) ABSTRACT

Provided are a heat exchanger that does not impede downsizing and removes water in the heat absorbing pipe adequately with a simple configuration even when the reduction in diameter of the heat absorbing pipe is made. A heat exchanger 5 in which heat absorbing pipes 51 are disposed in a multi-tier arrangement within a casing 50 which is the passage of combustion exhaust gas, both pipe ends 511,512 of each of the heat absorbing pipes 51 are connected respectively to two headers 54, 55 provided on a side plate 52 of the casing 50, and water introduced from an external pipe 63 to each of the heat absorbing pipes 51 through the header 54 is heat-exchanged and heated by combustion exhaust gas. The pipe ends 511, 512 of the heat absorbing pipes 51 are arranged at a predetermined vertical interval. A drainage plate 56 for forming a drainage passage through which the water that has reached the pipe end openings 51A of respective heat absorbing pipes 51 is removed during drainage operation for the heat absorbing pipes 51, is disposed in the header 54 disposed on a lower side of the heat absorbing pipes 51 so as to face a number of the pipe end openings 51A vertically arranged in a state of continuous.

8 Claims, 11 Drawing Sheets

(51) Int. Cl.
- *F24H 9/14* (2006.01)
- *F28D 1/047* (2006.01)
- *F28D 7/02* (2006.01)
- *F28F 1/08* (2006.01)
- *F24H 9/16* (2006.01)
- *F24D 19/00* (2006.01)
- *F28D 21/00* (2006.01)
- *F24H 9/00* (2006.01)

(52) U.S. Cl.
CPC ............. *F24H 9/16* (2013.01); *F28D 1/0477* (2013.01); *F28D 7/024* (2013.01); *F28F 1/08* (2013.01); *F28F 9/0278* (2013.01); *F24H 9/0015* (2013.01); *F28D 2021/0024* (2013.01); *F28F 2265/06* (2013.01); *Y02B 30/102* (2013.01)

(58) Field of Classification Search
USPC ........................................ 165/174, 150, 157
See application file for complete search history.

(56) References Cited

U.S. PATENT DOCUMENTS

| | | | | |
|---|---|---|---|---|
| 2,915,294 | A * | 12/1959 | Christensen | 165/174 |
| 3,191,672 | A * | 6/1965 | Logan | 165/119 |
| 3,706,534 | A * | 12/1972 | Verheul | 239/590.3 |
| 5,465,783 | A * | 11/1995 | O'Connor | 165/134.1 |
| 2005/0126770 | A1* | 6/2005 | Higashiyama | 165/174 |
| 2007/0289559 | A1 | 12/2007 | Amada | |
| 2008/0006226 | A1* | 1/2008 | Takeda et al. | 122/18.1 |
| 2008/0061160 | A1* | 3/2008 | Ootomo et al. | 237/8 R |
| 2010/0089559 | A1* | 4/2010 | Gorbounov | F25B 39/028 165/174 |
| 2010/0229804 | A1* | 9/2010 | Okamoto et al. | 122/18.2 |

OTHER PUBLICATIONS

Written Opinion for International Application No. PCT/JP2010/057375 mailed on Nov. 6, 2012.
International Search Report for International Application No. PCT/JP2010/057375 mailed on Aug. 3, 2012.

* cited by examiner

HEAT EXCHANGER

TECHNICAL FIELD

The present invention relates to a heat exchanger which carries out heat-exchange heating of the water flowing through heat absorbing pipes through two headers by combustion exhaust gas.

BACKGROUND ART

A latent heat recovery type heat exchanger mounted in a high thermal efficiency water heater is adapted to recover latent heat by providing a plurality of heat absorbing pipes within a casing which is the passage of combustion exhaust gas, arranging both pipe ends of each of the heat absorbing pipes at a predetermined vertical interval, connecting the both ends of each of the heat absorbing pipes to two headers provided on a side plate of the casing, respectively, and introducing water from external pipe to the heat absorbing pipes through the inflow header to condense moisture in the combustion exhaust gas (see, for example, PTL 1)

In such a heat exchanger, a reduction in diameter of the heat absorbing pipe is promoted in order to realize further downsizing and further improvement in thermal efficiency.

That is, the reduction in diameter of the heat absorbing pipe allows more pipes to be provided in a limited space within the casing and increases a heat transfer area of the entire heat absorbing pipe. However, the reduction in diameter of the heat absorbing pipe poses a problem in that when water is removed from the heat absorbing pipe in order to prevent water inside the heat absorbing pipe from freezing during wintertime, a water film is formed at a pipe end opening of the heat absorbing pipe due to water surface tension, causing the water to remain at a downstream portion of the heat absorbing pipe in a water flow direction. Thus, in a case where the reduction in diameter of the heat absorbing pipe is made, some measures need to be taken for smoothly removing water in the heat absorbing pipe.

Figure 11:
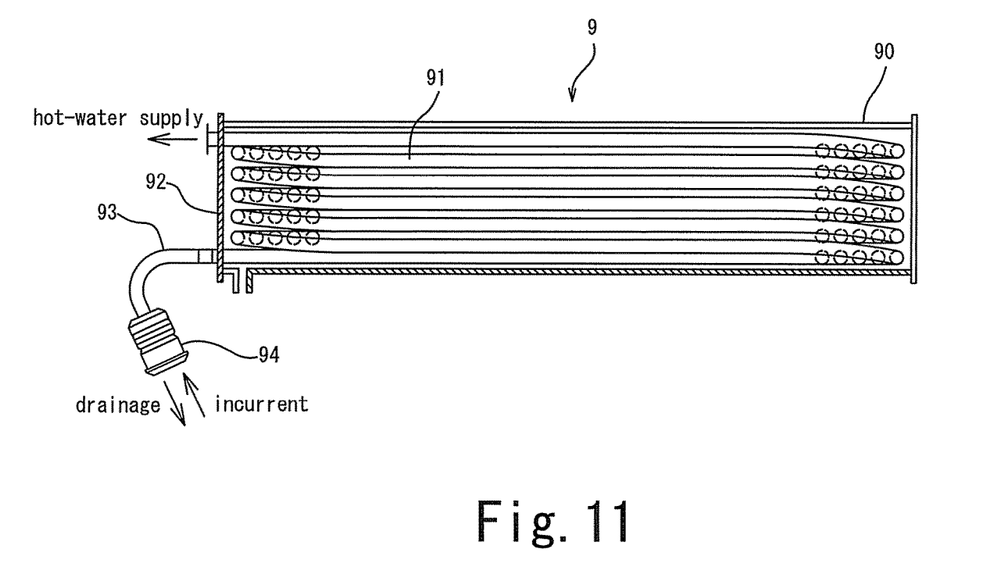
FIG. 11 is a cross-sectional view of a conventional heat exchanger.

FIG. 11 illustrates a conventional heat exchanger 9. The heat exchanger 9 includes a plurality of heat absorbing pipes 91 in a casing 90, each having both ends penetrating a side plate 92 of the casing 90, a downward-bending extended tubular body 93 connected to one of the pipe ends of each of the heat absorbing pipes 91 appeared from the side plate 92, and a header 94 mounted to a lower end of the extended tubular body 93 and is configured to drain water in the heat absorbing pipes 91 through the header 94 (see, for example, PTL 2). According to the conventional heat exchanger 9, even when the heat absorbing pipes 91 each having a reduced diameter are used, formation of the water film at a leading end opening of the extended tubular body 93 is prevented at drainage time by hydraulic head pressure in the extended tubular body 93, reliably removing water in the heat absorbing pipes 91.

CITATION LIST

Patent Literatures

PTL1: Japanese Unexamined Patent Publication No. 2007-163096

PTL2: Japanese Unexamined Patent Publication No. 2007-333343

SUMMARY OF INVENTION

Technical Problem

However, in the above heat exchanger 9, the extended tubular body 93 or the header 94 is provided extending outside of the casing 90, impeding downsizing of the heat exchanger 9. Further, the extended tubular body 93 needs to be provided for each of the plurality of heat absorbing pipes 91, resulting in an increase in the number of components or brazing portions, which in turn increases the number of assembling processes.

The present invention has been made in view of the above situation, and an object thereof is to provide a heat exchanger that does not impede downsizing and removes water in the heat absorbing pipe adequately with a simple configuration even when the reduction in diameter of the heat absorbing pipe is made.

Solution to Problem

A heat exchanger according to the present invention is a heat exchanger in which heat absorbing pipes are disposed in a multi-tier arrangement within a casing which is the passage of combustion exhaust gas, both pipe ends of each of the heat absorbing pipes are connected respectively to two headers provided on a side plate of the casing, and water introduced from an external pipe to each of the heat absorbing pipes through the header is heat-exchanged and heated by combustion exhaust gas. The pipe ends of the heat absorbing pipes are arranged at a predetermined vertical interval. A drainage plate for forming a drainage passage through which the water that has reached the pipe end openings of respective heat absorbing pipes is removed during drainage operation for the heat absorbing pipes, is disposed in the header disposed on a lower side of the heat absorbing pipes so as to face a number of the pipe end openings vertically arranged in a state of continuous.

According to the above configuration, when water is removed from the heat absorbing pipe, the water that has reached the lower side pipe end opening is smoothly discharged from the pipe end opening to a connecting port of the header for connecting the external pipe through the drainage passage formed by the drainage plate. This prevents formation of a water film at the pipe end opening even if the water film is to be retained at the pipe end opening due to water surface tension when the water is removed from the heat absorbing pipe. Thus, even when the diameter of the heat absorbing pipe is reduced, the water does not remain at a downstream portion of the heat absorbing pipe in a water flow direction, and the water can reliably be removed from the heat absorbing pipe. This effect can be achieved by a simple configuration in which the drainage plate is provided in the header, thus not impeding downsizing of the heat exchanger.

The drainage passage is preferably composed of a vertically extending concave groove formed in the drainage plate, and the concave groove preferably has a groove width smaller than a diameter of each of the pipe end openings and communicates with the pipe end openings.

According to the above configuration, when water is removed from the heat absorbing pipe, the water that has reached the lower side pipe end opening is discharged from the pipe end opening to the connecting port of the header for connecting the external pipe through the vertically extending concave groove formed in the drainage plate . As a result, it prevents the water film from being formed at the pipe end opening. Thus, even when the diameter of the heat absorbing pipe is reduced, the water does not remain at a downstream portion of the heat absorbing pipe in a water flow direction, and the water can reliably be removed from the heat absorbing pipe.

The drainage passage may be composed of a gap between the pipe end openings and the drainage plate, and a width of the gap may be set equal to or less than a swelling amount of a water film to be formed at the pipe end opening due to the water surface tension.

According to the above configuration, when water is removed from the heat absorbing pipe, the water that has reached the lower side pipe end opening is smoothly discharged from the pipe end opening to the connecting port of the header for connecting the external pipe through the gap between the pipe end opening and the drainage plate. As a result, it prevents the water film from being formed at the pipe end opening. Thus, even when the diameter of the heat absorbing pipe is reduced, the water does not remain at a downstream portion of the heat absorbing pipe in a water flow direction, and the water can reliably be removed from the heat absorbing pipe.

The drainage plate is formed of a water permeable member.

According to the above configuration, the water can pass smoothly through the drainage plate, so that flow of water to the heat absorbing pipes through the header is not impeded in normal hot water feeding operation.

Lower ends of the lower side pipe end openings of the heat absorbing pipes are preferably positioned above a lower end of a connecting port of the header for connecting the external pipe.

According to the above configuration, in addition to the above-described effects, when water is removed from the heat absorbing pipe, the water that has reached the lower side pipe end opening is smoothly discharged from the pipe end opening to the connecting port of the header for connecting the external pipe by a difference in height between the lower end of the pipe end opening and lower end of the connecting port.

Thus it further reliably prevents the water film from being formed at the pipe end opening at the drainage time. Therefore, even when the diameter of the heat absorbing pipe is reduced, the water does not remain at a downstream portion of the heat absorbing pipe in a water flow direction, and the water can reliably be removed from the heat absorbing pipe.

The heat absorbing pipes are preferably disposed tilted downward to the front and vertically such that pipe cross sections are staggered in a zig-zag alignment as viewed in a vertical cross section, and in lower side heat absorbing pipes, the pipe end opening of the lowermost heat absorbing pipe is preferably positioned rearward of the pipe end opening of the second lowest heat absorbing pipe.

According to the above configuration, on the lower side heat absorbing pipes, as compared to a case where the pipe end opening of the lowermost heat absorbing pipe is positioned forward of the pipe end opening of the second lowest heat absorbing pipe, it is possible to easily dispose the lower end of the pipe end opening of the lowermost heat absorbing pipe above the lower end of the connecting port of the header for connecting the external pipe without increasing a vertical length of the header, so that downsizing of the heat exchanger is not impeded.

Advantageous Effects of Invention

As described above, according to the present invention, even when the diameter of the heat absorbing pipe is reduced, the water can reliably be removed from the heat absorbing pipes with a simple configuration in which the drainage plate is provided so as to face the pipe end openings of the lower side heat absorbing pipes. This prevents the water from remaining in the heat absorbing pipes after the drainage operation, which in turn prevents the water remaining in the heat absorbing pipes from freezing during wintertime to destroy the heat absorbing pipes. Thus, a heat exchanger capable of achieving downsizing and high thermal efficiency, as well as, capable of reliably removing the water from the heat absorbing pipes can be provided.

DESCRIPTION OF EMBODIMENTS

Embodiments of the present invention will be described below with reference to the accompanying drawings.

Figure 1:
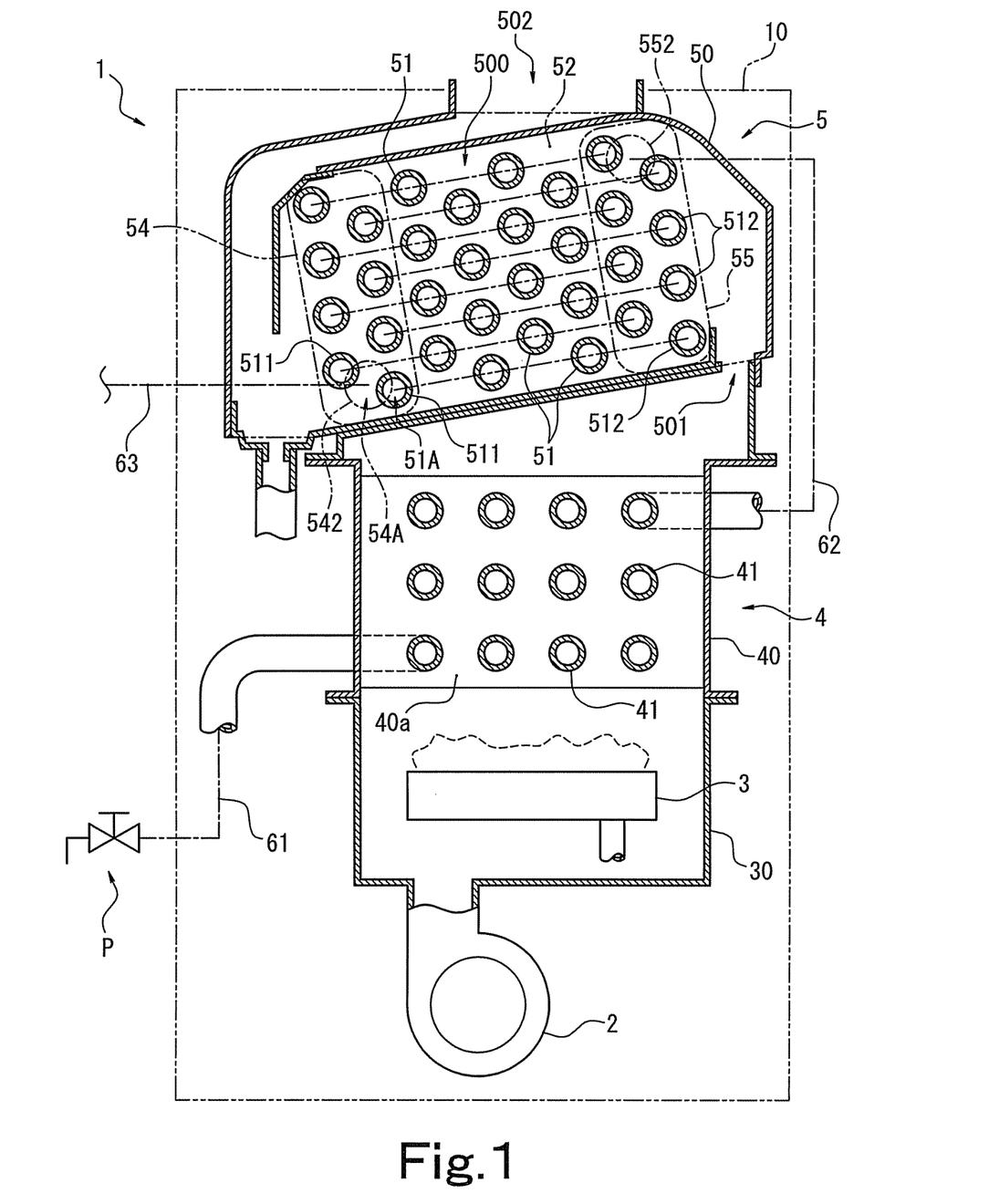
FIG. 1 is a schematic configuration view of a water heater incorporating a heat exchanger according to an embodiment.

As illustrated in FIG. 1, a latent heat recovery type water heater 1 includes, in a outer casing 10, a combustion casing 30 incorporating a gas burner 3, a main heat exchanger 4 disposed above the combustion casing 30 and configured to mainly recover sensible heat in combustion exhaust gas, and a sub heat exchanger 5 disposed above the main heat exchanger 4 and configured to mainly recover latent heat in the combustion exhaust gas. An air supply fan 2 that supplies combustion air into the combustion casing 30 is installed at a bottom portion of the combustion casing 30.

The main heat exchanger 4 includes, in a rectangular-cylindrical body portion 40 with opened top and bottom thereof, a plurality of heat absorbing fins 40a arranged side by side at intervals and a heat absorbing pipe 41 that penetrates the heat absorbing fins 40a in a meandering state. A lower end of the body portion 40 is connected with an upper end of the combustion casing 30, and an upper end of the body portion 40 is connected with a lower end of a casing 50 of the sub heat exchanger 5. A downstream end of the heat absorbing pipe 41 of the main heat exchanger 4 is connected with a hot water pipe 61 leading to a hot water supply destination P such as a faucet or a shower, and an upstream end of the heat absorbing pipe 41 is connected with a connecting pipe 62 leading to the sub heat exchanger 5.

The sub heat exchanger 5 is a latent-heat heat exchanger and includes, in the rectangular box-shaped casing 50, a plurality of (in this case, eight) heat absorbing pipes 51. A lateral passage 500 extending in a front-rear direction is formed in the casing 50, and the heat absorbing pipes 51 are mounted in the lateral passage 500. An inflow header 54 and an outflow header 55 are provided on a side plate 52 on one side of the casing 50 in the lateral direction. One end portions of the plurality of the heat absorbing pipes 51 are connected to the inflow header 54, and the other end portions thereof are connected to the outflow header 55. An exhaust inlet port 501 allowing the lateral passage 500 and an inner space of the body portion 40 to communicate with each other is formed at a bottom rear portion of the casing 50, and an exhaust port 502 allowing the lateral passage 500 and a space outside the outer casing 10 to communicate with each other is formed at an upper portion of the casing 50.

When the hot water supply destination P is opened to start burning of the gas burner 3, combustion exhaust gas of the gas burner 3 passes through the body portion 40 of the main heat exchanger 4, guided from the exhaust inlet port 501 to the lateral passage 500, and passes through gaps between the heat absorbing pipes 51, to be finally discharged outside the outer casing 10 through the exhaust port 502. On the other hand, water supplied from waterworks to the inflow header 54 of the sub heat exchanger 5 through a water supply pipe 63 is heat-exchanged and heated by the latent heat in the combustion exhaust gas when passing through the heat absorbing pipes 51 and, thereafter, guided to the main heat exchanger 4 through the outflow header 55 and connecting pipe 62 sequentially. The water guided to the main heat exchanger 4 is heat-exchanged and heated by the sensible heat in the combustion exhaust gas when passing through the heat absorbing pipe 41 of the main heat exchanger 4 and then supplied to the hot water supply destination P through the hot water pipe 61.

Figure 2:
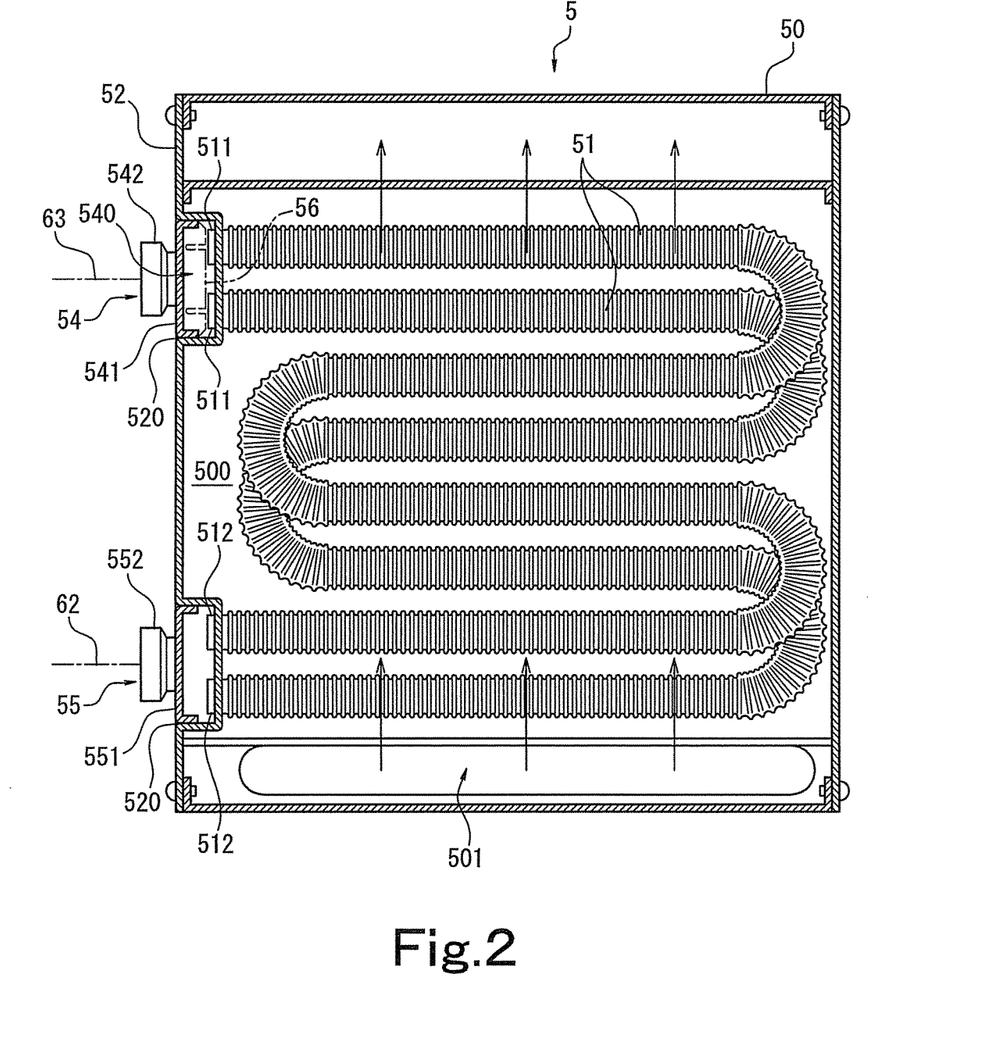
FIG. 2 is a horizontal cross-sectional view of the heat exchanger according to the embodiment.

As illustrated in FIG. 2, the heat absorbing pipes 51 of the sub heat exchanger 5 are each obtained by bending, in a meandering state, a corrugated pipe formed of highly corrosion-resistant metal, such as stainless or titanium. Inlet side pipe ends 511 of the respective heat absorbing pipes 51 and outlet side pipe ends 512 thereof are connected, in a penetrating manner, to two concave portions 520 formed in the side plate 52 on one side of the casing 50, respectively. The inflow header 54 that collectively connects the inlet side pipe ends 511 to the water supply pipe 63 is provided in the concave portion 520 on the side of the inlet side pipe ends 511, and the outflow header 55 that collectively connects the outlet side pipe ends 512 to the connecting pipe 62 is provided in the concave portion 520 on the side of the outlet side pipe ends 512.

As illustrated in FIG. 1, the inflow header 54 is disposed lower than the outflow header 55 and, in conformity with the positional relationship between the inflow header 54 and outflow header 55, the heat absorbing pipes 51 are disposed tilted downward to the front at a predetermined angle (e.g.,) 5°) such that the inlet side pipe ends 511 thereof are positioned lower than the outlet side pipe ends 512. The heat absorbing pipes 51 are disposed vertically such that cross sections thereof are staggered in a zig-zag alignment as viewed in a vertical cross section and that the lowermost heat absorbing pipe 51 is positioned rearward of the second lowest heat absorbing pipe 51.

Figure 3:
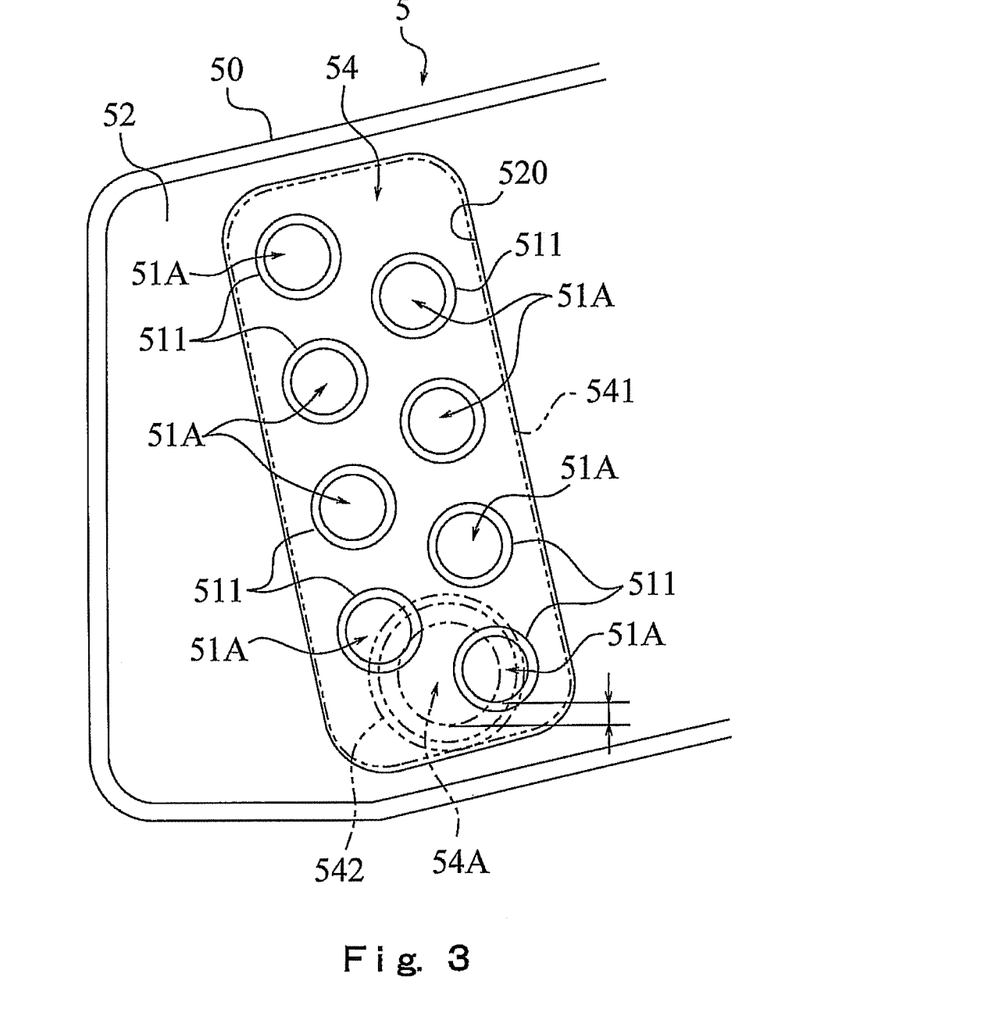
FIG. 3 is a side view illustrating a vicinity of an inflow header of the heat exchanger according to the embodiment.

As illustrated in FIG. 3, the concave portion 520 is formed into a vertically long rectangular shape and tilted toward the front side of the casing 50 at a predetermined angle (e.g., 5°). The inlet side pipe ends 511 of the heat absorbing pipes 51 are arranged in two rows along a longitudinal direction of the concave portion 520 and staggered in a zig-zag alignment. The inlet side pipe end 511 of the lowermost heat absorbing pipe 51 is positioned rearward of the inlet side pipe end 511 of the second lowest heat absorbing pipe 51.

Pipe end opening portions 51A opened at the respective inlet side pipe ends 511 are covered by a header body 541 of the inflow header 54 from outside the casing 50. A tubular joint portion 542 to be connected to the water supply pipe 63 is provided at a lower portion of an outer surface of the header body 541, and the pipe end opening portions 51A communicate with a connecting port 54A opened at the joint portion 542 through a closed space within the inflow header 54. Thus, when hot water feeding operation to the hot water supply destination P is started, water supplied from waterworks to the water supply pipe 63 passes through the connecting portion 54A and closed space 540 sequentially to be guided to the pipe end opening portions 51A and fed in parallel into the heat absorbing pipes 51. When drainage operation is performed, the water in the heat absorbing pipes 51 passes through the pipe end opening portions 51A and closed space 540 sequentially to be discharged to the connecting port 54A. Note that, as illustrated in FIG. 4, a joint portion 552 of the outflow header 55 to be connected to the connecting pipe 62 is provided at an upper portion of an outer surface of a header body 551 of the outflow header 55 and positioned higher than the joint portion 542 of the inflow header 54.

As mentioned in "Background Art", also in the sub heat exchanger 5, a reduction in diameter of the heat absorbing pipe 51 has been made so as to achieve further downsizing and high thermal efficiency. Specifically, eight heat absorbing pipes 51 each having the pipe end opening portion 51A with a diameter of 10 mm are arranged in a zig-zag alignment and accommodated within the lateral space 500 of the casing 50. Disposing a number of the heat absorbing pipes 51 within the limited space in this manner leads to downsizing, as well as, increases a heat transfer area of the entire heat absorbing pipe 51 to result in high thermal efficiency. However, when the reduction in diameter of the heat absorbing pipe 51 is made, a water film may be formed at the pipe end opening portion 51A due to water surface tension when drainage from the heat absorbing pipe 51 is conducted, which may cause the water to remain at a downstream portion of the heat absorbing pipe 51. Thus, in the present embodiment, the following configuration is employed in order to allow the water in the heat absorbing pipe 51 to be smoothly removed even when the reduction in diameter of the heat absorbing pipe 51 is made.

Figure 4:
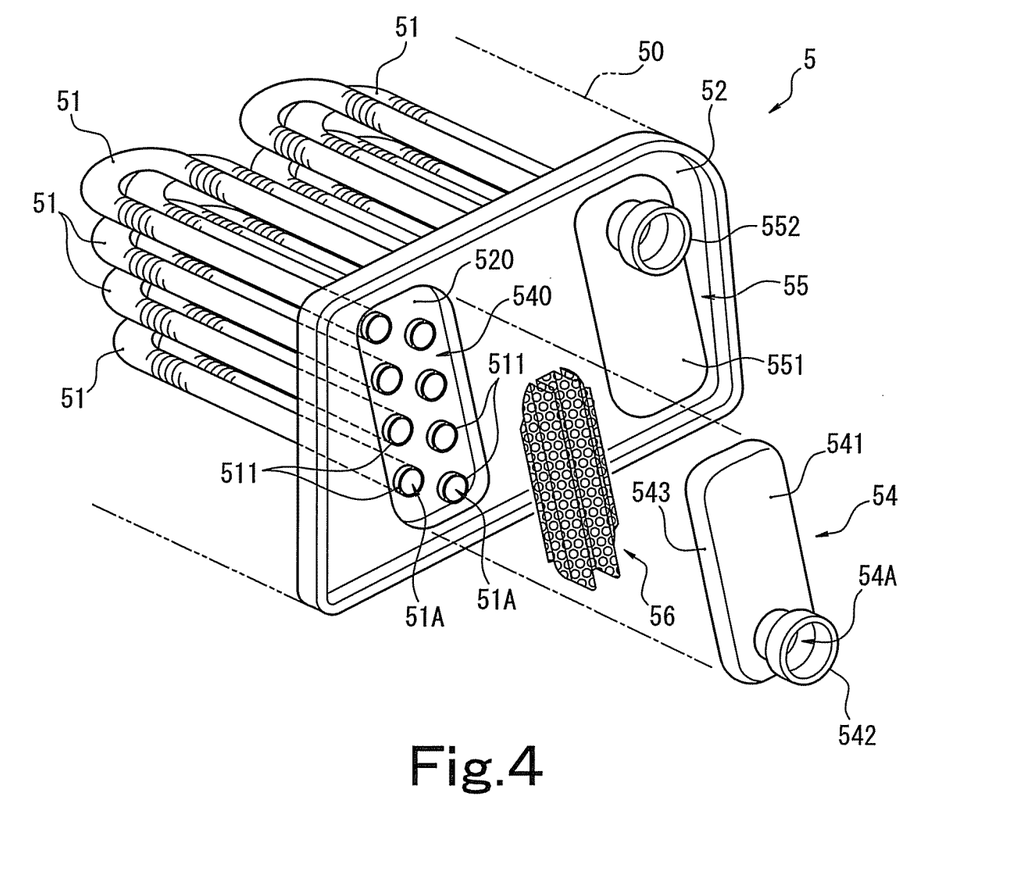
FIG. 4 is an exploded view of a vicinity of the inflow header of the heat exchanger according to the embodiment.
Figure 5:
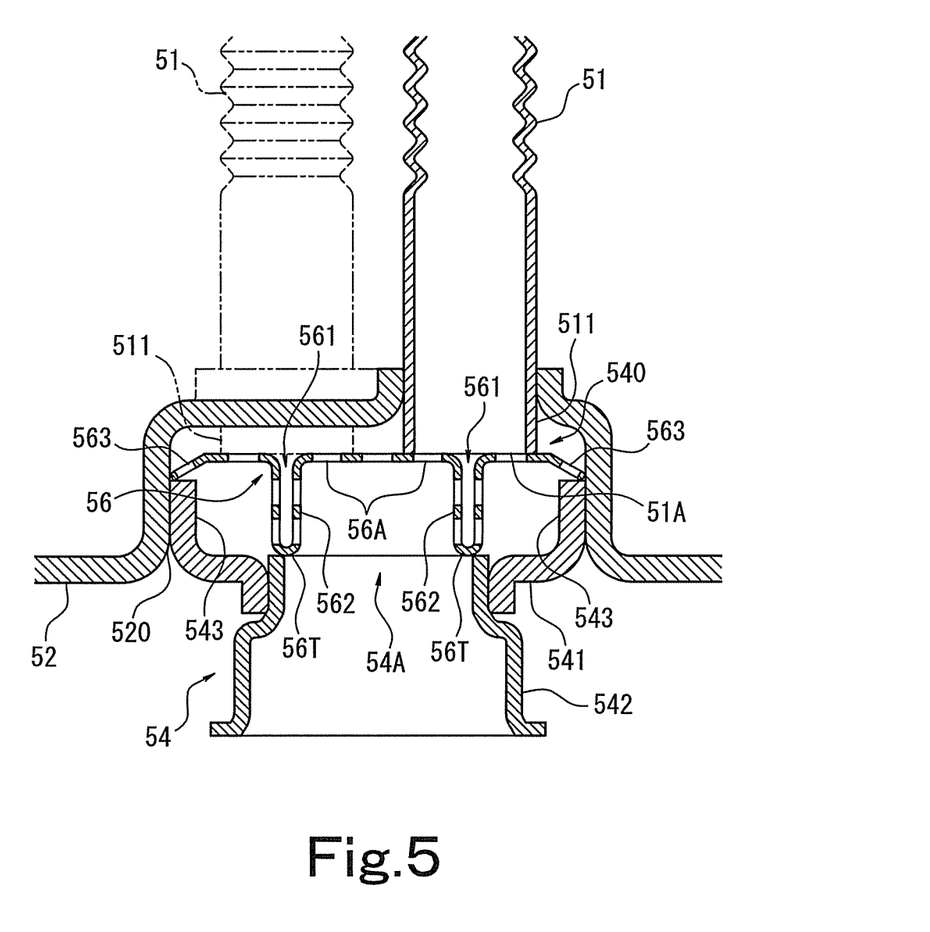
FIG. 5 is a horizontal cross-sectional view of the vicinity of the inflow header of the heat exchanger according to the embodiment.
Figure 6:
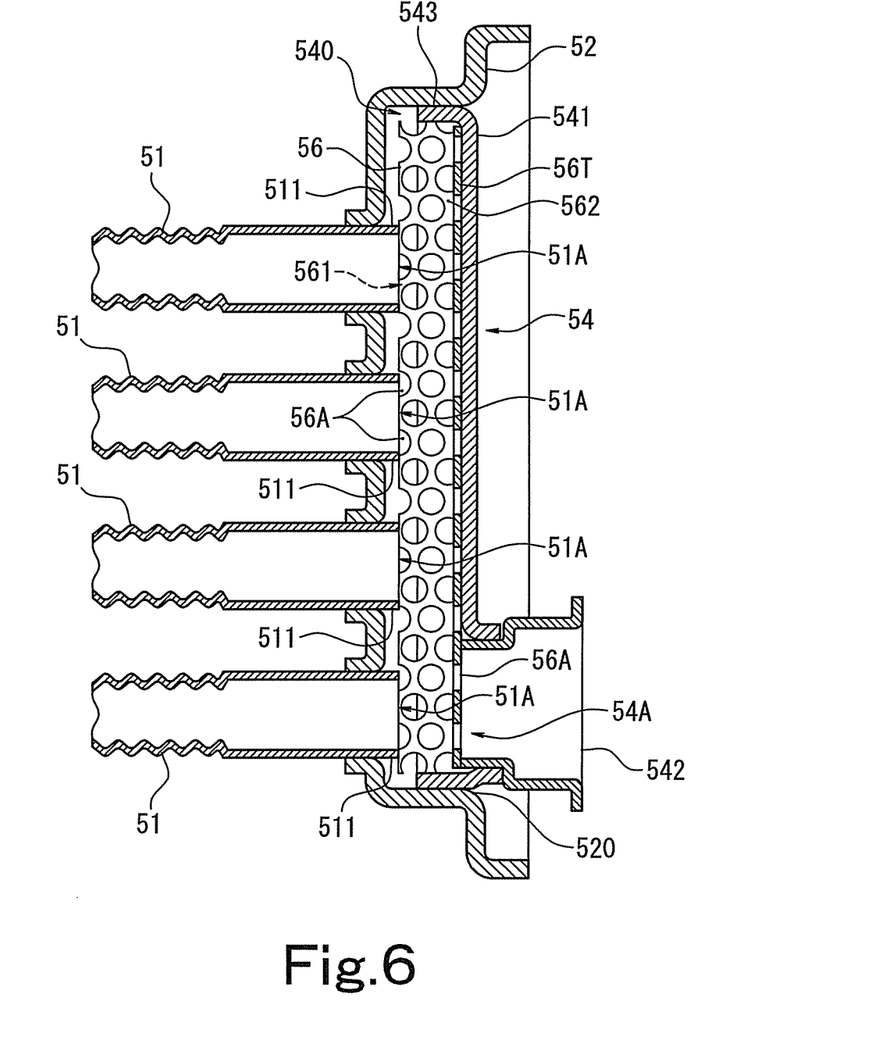
FIG. 6 is a vertical cross-sectional view of the vicinity of the inflow header of the heat exchanger according to the embodiment.

As illustrated in FIGS. 4 to 6, the lower side inflow header 54 covers, from outside the casing 50, the entire concave portion 520 by the header body 541 formed into a shallow container shape having a peripheral wall 543 over the entire periphery thereof. The peripheral wall 543 is fixed in a closely contacting manner to the entire inner periphery of the concave portion 520, and the closed space 540 is formed between the header body 541 and concave portion 520.

Figure 7:
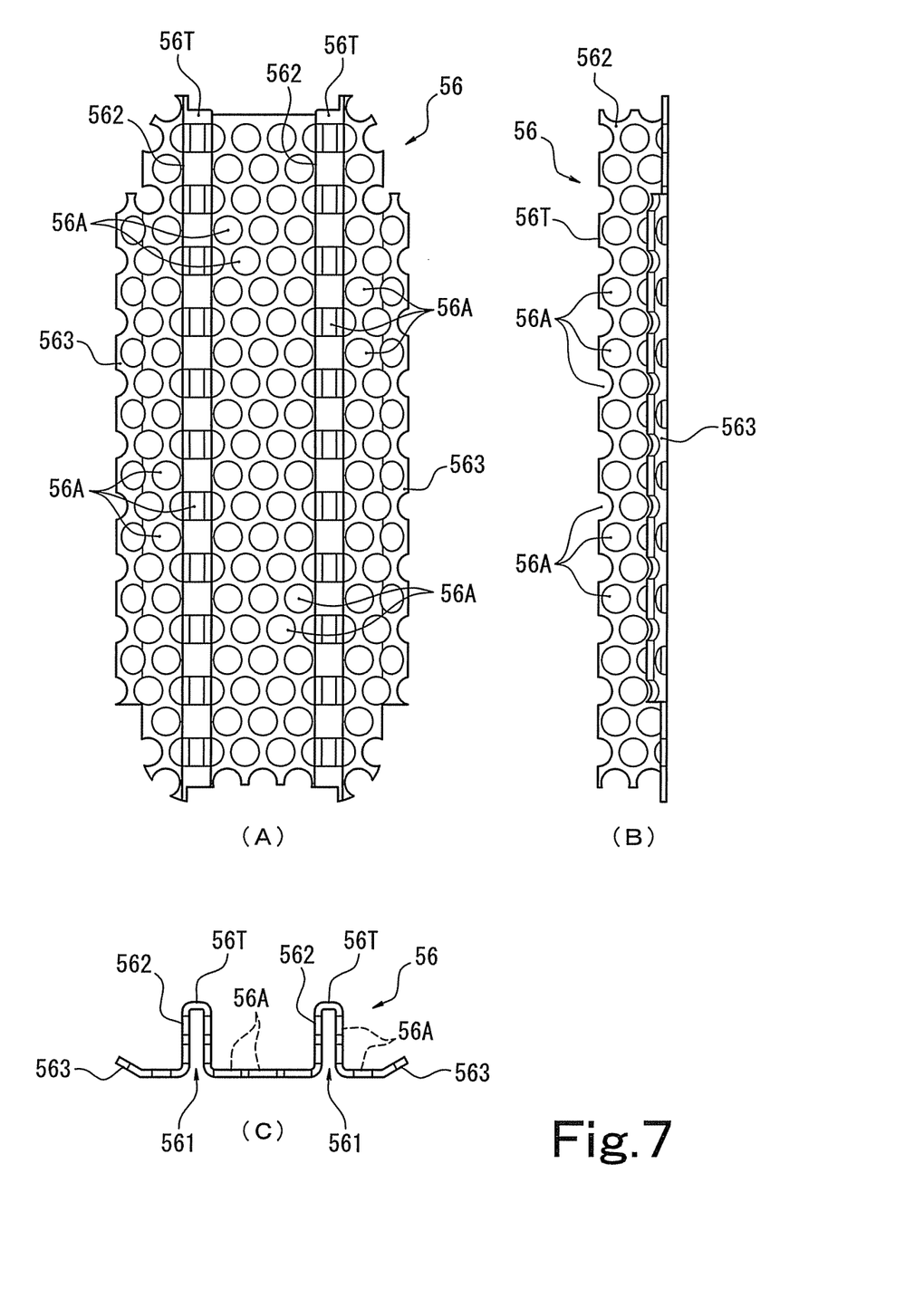
FIGS. 7A to 7C are front (7A), right side (7B), and bottom (7C) views illustrating a drainage plate of the heat exchanger according to the embodiment.

A drainage plate 56 illustrated in FIG. 7 which is formed of a punching metal is accommodated in the closed space 540. This drainage plate 56 forms a drainage passage for removing water that has reached the pipe end opening portions 51A of the heat absorbing pipes 51 when the water is removed from the heat absorbing pipe 51. More specifically, the drainage plate 56 faces the pipe end opening portions 51A of the heat absorbing pipes 51. Two rows of vertically extending concave grooves 561 are formed on one surface of the drainage plate 56 that faces the pipe end opening portions 51A. The concave grooves 561 are disposed so as to face continuous with respect to the pipe end opening portions 51A of each of the columns arranged in two rows to the left and right one column is made up of four pipe end opening portions 51A. These concave grooves 561 each serve as the drainage passage for removing water that has reached the pipe end opening portions 51A when the water is removed from the heat absorbing pipe 51. Each of the concave grooves 561 has a width smaller (for example, diameter of each pipe end opening portion 51A is set to 10 mm, and width of the each concave groove 561 is set to approximately 1 mm) than the diameter of each of the pipe end opening portions 51A, and a large number of punched holes 56A formed in the drainage plate 56 each have a diameter smaller than the diameter of each of the pipe end opening portions 51A.

Projecting ribs 562 constituting each of the concave grooves 561 are formed in the drainage plate 56 so as to ensure strength of the drainage plate 56. Further, bent portions 563 each bent obtusely toward the projecting rib 562 side are formed on both ends of the drainage plate 56. Furthermore, the drainage plate 56 has an outer shape substantially corresponding to the inner periphery of the concave portion 520. The projecting ribs 562 are formed so as to have a height such that top portions 56T thereof make contact with an inside of the header body 541. The bent portions 563 are formed such that leading ends thereof make contact with an upper end of the peripheral wall 543 of the header body 541. A surface of the drainage plate 56 on a side on which the concave grooves 561 are opened contacts a periphery of the pipe end openings 51A.

When not illustrated drain plugs provided respectively in the water supply pipe 63 and hot water pipe 61 are opened to start the operation of removing water from the heat absorbing pipes 51 of the sub heat exchanger 5, the water in the heat absorbing pipes 51 is first guided to the pipe end openings 51A side of a water inlet side by a difference in height between the inlet side and an outlet side of the heat absorbing pipes 51, and passes through the plurality of pinched holes 56A formed in the drainage plate 56 to be smoothly discharged to the connecting port 54A side.

When the water in the heat absorbing pipes 51 is discharged up to the downstream portion in the water flow direction thereof, hydraulic head pressure resulting from the height difference becomes small, with the result that a water film tends to be formed easily in the pipe end opening portion 51A due to the water surface tension. However, in the present embodiment, the water that has reached the pipe end opening portions 51A does not form the water films but enters the concave grooves 561 of the drainage plate 56 and flows down along the concave grooves 561. This drainage principle is considered as follows.

It is considered that the water that has reached the pipe end opening portion 51A permeates the concave groove 561 by capillary action in the concave groove 561, and that the water that has permeated the concave groove 561 flows down along the concave groove 561 as a joint result of its own weight and capillary action. The water that has reached the pipe end opening portions 51A is thus made to flow sequentially through the concave grooves 561, and it follows that even when the hydraulic head pressure resulting from the height difference becomes small, the water in the water heat absorbing pipes 51 does not form the water films at the pipe end opening portions 51A but is discharged to the connecting port 54A side reliably. Thus, even when the diameter of the heat absorbing pipe 51 is reduced, the water does not remain at the downstream portion of the heat absorbing pipes 51 in the water flow direction, and the water can reliably be removed from the heat absorbing pipes 51.

Further, in the present embodiment, in order for the water in the heat absorbing pipes 51 to be smoothly removed, the following configuration is adopted. That is, in the inflow header 54 arranged on the lower position side, the lower ends of the pipe end openings 51A of all the heat absorbing pipes 51 are positioned above a lower end of the connecting port 54A of the inflow header 54, as illustrated in FIGS. 1 and 3. With this configuration, when the water is removed from the heat absorbing pipes 51, the water that has reached the lower side pipe end opening portions 51A is smoothly discharged from the pipe end opening portions 51A to the connection port 54A of the inflow header 54 by the height difference between the lower end of the pipe end opening portion 51A and lower end of the connection port 54A of the inflow header 54. This further reliably prevents the water films from being formed at the pipe end opening portions 51A of the heat absorbing pipe 51. Thus, the water does not remain at the downstream portion of the heat absorbing pipes 51 in the water flow direction, and the water can reliably be removed from the heat absorbing pipes 51.

Further, in the present embodiment, the inlet side pipe end 511 of the lowermost heat absorbing pipe 51 is positioned rearward of the inlet side pipe end 511 of the second lowest heat absorbing pipe 51. With this configuration, as compared to a case where the pipe end opening portion 51A of the lowermost heat absorbing pipe 51 is positioned forward of the pipe end opening portion 51A of the second lowest heat absorbing pipe 51, it is possible to easily dispose the lower end of the pipe end opening portion 51A of the lowermost heat absorbing pipe 51 above the lower end of the connecting port 54A of the inflow header 54 without increasing a vertical length of the inflow header 54, so that downsizing of the sub heat exchanger 5 is not impeded.

As described above, according to the sub heat exchanger 5 of the present embodiment, water can reliably be removed from the heat absorbing pipe 51 even when the reduction in diameter of the heat absorbing pipe 51 is made. This prevents a problem that the heat absorbing pipes 51 are destroyed by freezing due to the water remaining in the heat absorbing pipes 51, in spite of having done drainage operation. Thus, there can be provided the sub heat exchanger 5 capable of achieving further downsizing and high terminal efficiency, as well as, capable of adequately removing water from the heat absorbing pipes 51 with comparatively simple configurations in which the lower ends of the pipe end opening portions 51A are positioned above the lower end of the connecting port 54A and in which the drainage plate 56 is provided so as to face the pipe end opening portions 51A in the inflow header 54.

Further, providing the drainage plate 56 formed of the punching metal allows water that has been guided to the inlet side pipe end 511 of the heat absorbing pipe 51 to smoothly pass through the drainage plate 56, so that passage of water to the sub heat exchanger 5 is not impeded in normal hot water feeding operation.

(Other Embodiments)

(1) In the above-described embodiment, the surface of the drainage plate 56 on a side on which the concave grooves 561 are opened contacts the periphery of the pipe end opening portions 51A. Alternatively, however, like a drainage plate 57 illustrated in FIGS. 8 and 9, the drainage plate may be disposed with a gap 57S having a predetermined width interposed between the surface of the drainage plate on a side on which the concave groove 571 is opened and the periphery of the pipe end opening portions 51A. The width of the gap 57S is set equal to or less than a swelling amount (for example, diameter of the pipe end opening portions 51A are set to 10 mm, and width of the gap 57S is set to approximately 1 mm) of the water films to be formed at the pipe end opening portions 51A due to the water surface tension. This gap 57S composes a drainage passage for removing water that has reached the pipe end opening portions 51A.

Figure 8:
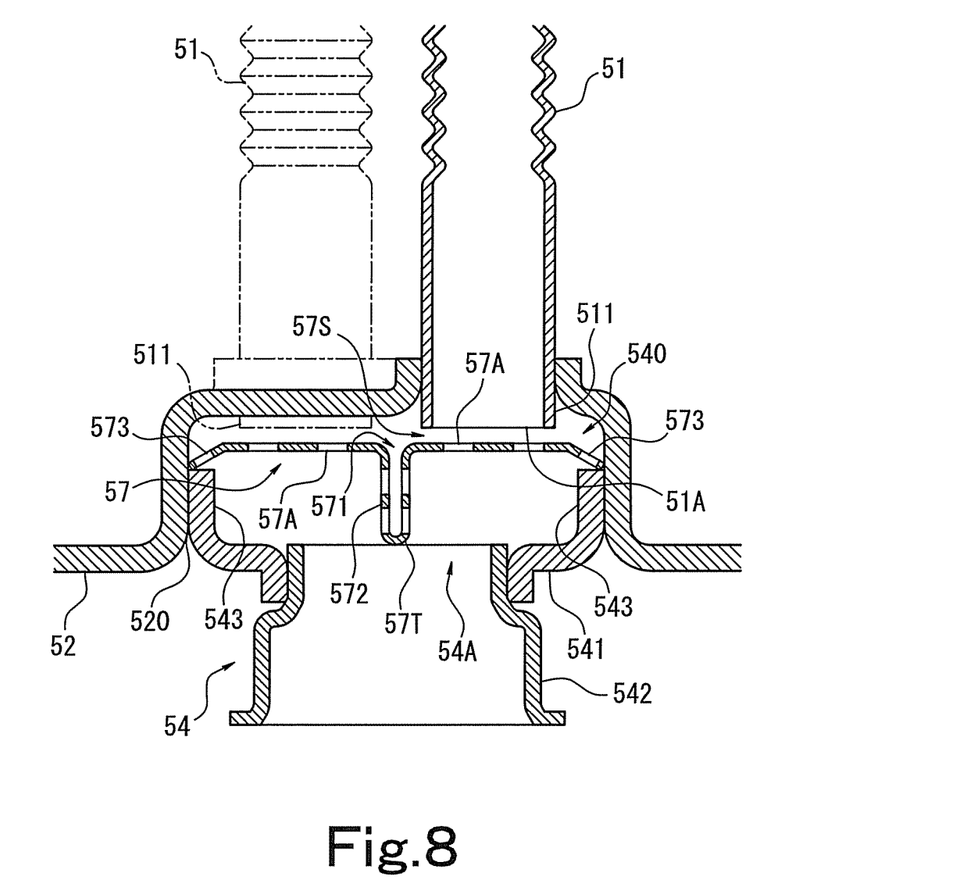
FIG. 8 is a horizontal cross-sectional view of a vicinity of an inflow header of the heat exchanger according to another embodiment.
Figure 9:
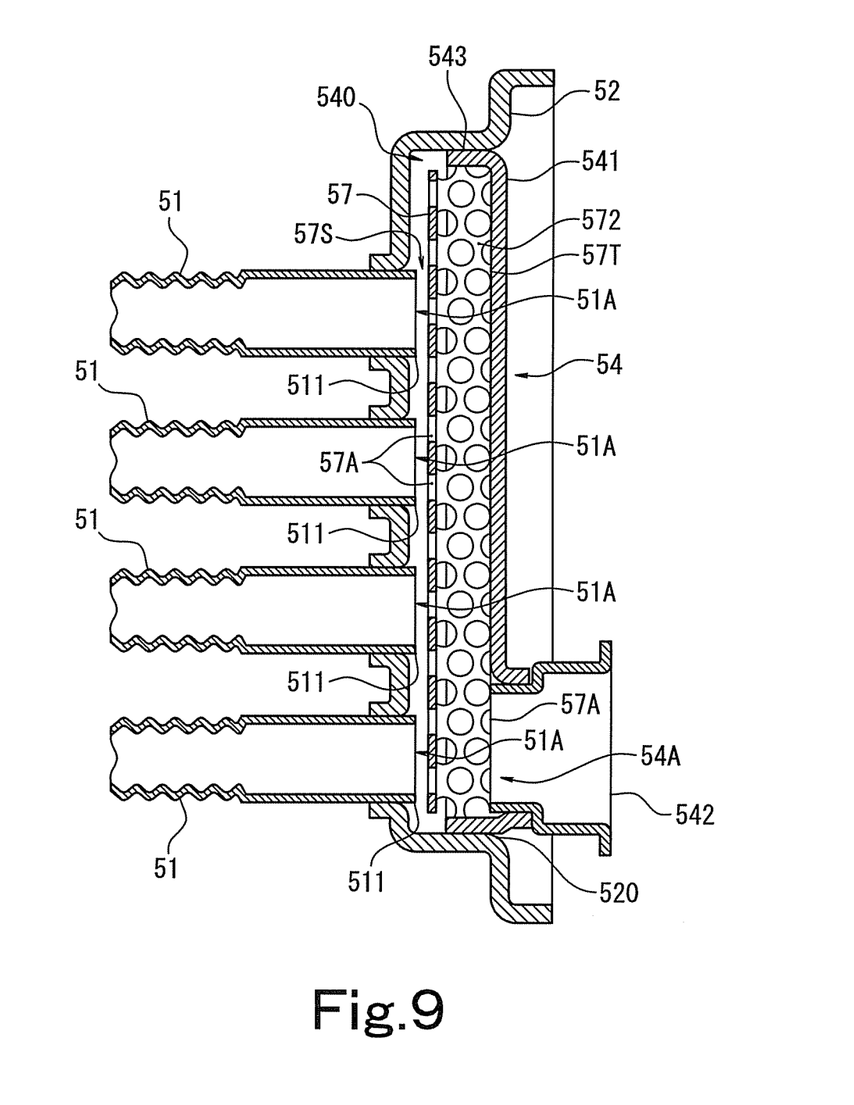
FIG. 9 is a vertical cross-sectional view of the vicinity of the inflow header of the heat exchanger according to still another embodiment.

One projecting rib 572 extending in a vertical direction of the drainage plate 57 so as to form the concave groove 571 is formed in a center portion of the drainage plate 57 in a width direction thereof to ensure strength of the drainage plate 57. Further, bent portions 573 each bent obtusely toward the projecting rib 572 side are formed on both ends of the drainage plate 57. Furthermore, the drainage plate 57 has an outer shape substantially corresponding to the inner periphery of the concave portion 520. The projecting rib 572 is formed so as to have a height such that a top portion 57T thereof makes contact with the inside of the header body 541. The bent portion 573 is formed such that a leading end thereof makes contact with the upper end of the peripheral wall 543 of the header body 541, and the above-mentioned gap 57S is provided between the drainage plate 57 and the pipe end opening portions 51A.

When not illustrated drain plugs provided respectively in the water supply pipe 63 and hot water pipe 61 are opened to start the operation of removing water from the heat absorbing pipes 51 of the sub heat exchanger 5, water in the heat absorbing pipes 51 passes through a plurality of pinched holes 57A formed in the drainage plate 57 to be smoothly discharged to the connecting port 54A side, as in the case of the above-described embodiment. Thereafter, when the water in the heat absorbing pipes 51 is discharged up to the downstream portion in the water flow direction thereof, the water that has reached the pipe end opening portions 51A is guided, before forming the water films, to the gap 57S between the drainage plate 57 and pipe end opening portions 51A and flows down along the drainage plate 57. That is, the water that has reached the pipe end opening portion 51A swells outside at the pipe end opening portions 51A to be brought into contact with the drainage plate 57. Thereafter, the water is guided to the gap 57S by capillary action at the gap 57S and flows down along the drainage plate 57 as a joint result of its own weight and capillary action at the gap 57S.

The water that has reached the pipe end opening portions 51A is thus made to flow sequentially through the drainage plate 57, and it follows that even when the hydraulic head pressure resulting from the height difference becomes small, the water in the heat absorbing pipes 51 is discharged to the connecting port 54A side reliably before forming the water films at the pipe end opening portions 51A. Thus, it is possible to obtain the same effect as in the above-described embodiment.

Figure 10:
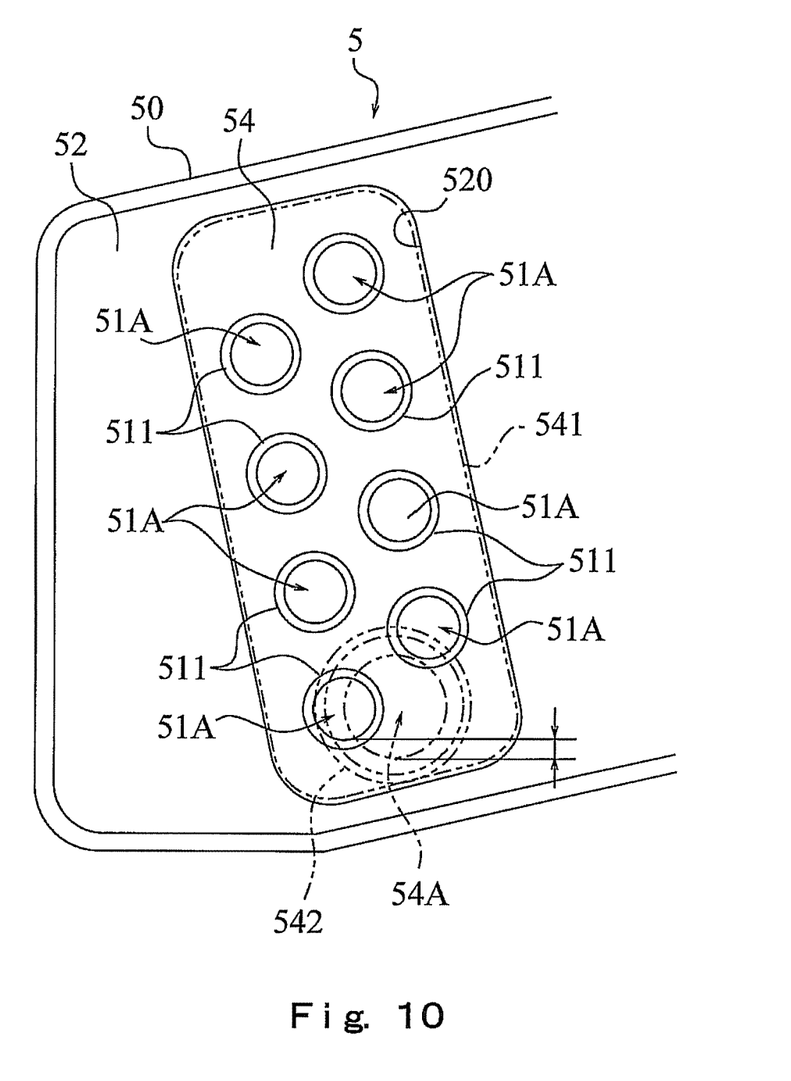
FIG. 10 is a side view illustrating a vicinity of an inflow header of the heat exchanger according to yet another embodiment.

(2) Further, as illustrated in FIG. 10, in the inflow header 54 arranged on the lower position side, the pipe end opening portion 51A of the lowermost heat absorbing pipe 51 may be disposed frontward of the pipe end opening portion 51A of the second lowest heat absorbing pipe 51 under the condition that the lower end of the pipe end opening portion 51A of the lowermost heat absorbing pipe 51 is positioned above the lower end of the connecting port 54A of the inflow header 54.

(3) The drainage plate 56 may be formed of any material as long as it does not impede the passage of water to the sub heat exchanger 5. For example, not only the punching metal, but also various water-permeable members, such as an expand metal, a net, a mesh, and a filter maybe used as the material of the drainage plate 56. Further, although a metallic material is preferably used for the drainage plate 56, a material such as plastic or ceramics may be used.

(4) Besides, various modifications, such as adoption of a heat absorbing pipes 51 having a spiral or helical configuration, may be made within the scope of the present invention.

(5) Further, the above-described heat exchanger 5 maybe used not only for the water heater, but also for various types of heat exchangers.

REFERENCE SIGNS LIST

1: Water heater
4: Main heat exchanger
5: Sub heat exchanger
50: Casing
51: Heat absorbing pipe
51A: Pipe end opening portion (lower side pipe end opening)
52: Side plate
54: Inflow header (header disposed on a lower side)
54A: Connecting port
55: Outflow header
56: Drainage plate
56A: Punched hole
511: Inlet side pipe end
512: Outlet side pipe end
520: Concave portion
561: Concave groove
562: Projecting rib
563: Bent portion

The invention claimed is:

1. A heat exchanger in which heat absorbing pipes are disposed in a multi-tier arrangement within a casing which is a passage of combustion exhaust gas, both pipe ends of each of the heat absorbing pipes are connected respectively to two headers provided on a side plate of the casing, and water introduced from an external pipe to each of the heat absorbing pipes through the header is heat-exchanged and heated by combustion exhaust gas, wherein
  one of the two headers is disposed on a lower side than the other of the headers,
  the pipe ends of the heat absorbing pipes are arranged at a predetermined vertical interval,
  drainage operation for the heat absorbing pipes is performed through a connecting port for connecting an external pipe provided on the one of the headers upon the drainage operation for the heat absorbing pipes,
  the one of the headers has a configuration in which it is connected with pipe ends of the heat absorbing pipes penetrating a concave portion formed in the side plate of the casing, and an entirety of the concave portion is covered from outside the casing by a header body formed into a shallow container shape having a peripheral wall of the entire periphery thereof so as to fix the peripheral wall of the header body to an entirety of an inner periphery of the concave portion, such that a closed space is formed between the header body and the concave portion, a drainage plate is disposed in the one of the headers disposed on the lower side of the heat absorbing pipes, the drainage plate being housed within the closed space, the drainage plate facing a number of the pipe end openings of the heat absorbing pipes, and a drainage passage through which water that has reached the pipe end openings of the head absorbing pipes is removed during the drainage operation is formed, the drainage passage is composed of a vertically extending concave groove formed in the drainage plate, the concave groove has a groove width at an opening portion that is to be an opening of the concave groove smaller than a diameter of each of the pipe end openings and has the opening portion communicated with each of the pipe end openings so as to face the pipe end openings vertically arranged, the drainage plate is formed of a plate-shaped object having a size that fits along the inner periphery of the concave portion, includes projecting ribs that form the concave groove, and includes bent portions, each bent obtusely toward the projecting rib side, formed on both ends of the drainage plate, the projecting ribs are formed so as to have a height such that top portions thereof make contact with an inside bottom of the header body, and the bent portions are formed so that leading ends thereof make contact with an upper end of the peripheral wall of the header body.

2. The heat exchanger according to claim 1, wherein the drainage plate is formed of a water permeable member.

3. The heat exchanger according to claim 2, wherein lower ends of the lower side pipe end openings of the heat absorbing pipes are positioned above a lower end of a connecting port of the header for connecting the external pipe.

4. The heat exchanger according to claim 2, wherein
the heat absorbing pipes are disposed tilted downward to the front and vertically such that pipe cross sections are staggered in a zig-zag alignment as viewed in a vertical cross section, and in lower side of the heat absorbing pipes, the pipe end opening of the lowermost heat absorbing pipe is positioned rearward of the pipe end opening of the second lowest heat absorbing pipe.

5. The heat exchanger according to claim 1, wherein lower ends of the lower side pipe end openings of the heat absorbing pipes are positioned above a lower end of a connecting port of the header for connecting the external pipe.

6. The heat exchanger according to claim 5, wherein
the heat absorbing pipes are disposed tilted downward to the front and vertically such that pipe cross sections are staggered in a zig-zag alignment as viewed in a vertical cross section, and in lower side of the heat absorbing pipes, the pipe end opening of the lowermost heat absorbing pipe is positioned rearward of the pipe end opening of the second lowest heat absorbing pipe.

7. The heat exchanger according to claim 1, wherein
the heat absorbing pipes are disposed tilted downward to the front and vertically such that pipe cross sections are staggered in a zig-zag alignment as viewed in a vertical cross section, and in lower side of the heat absorbing pipes, the pipe end opening of the lowermost heat absorbing pipe is positioned rearward of the pipe end opening of the second lowest heat absorbing pipe.

8. The heat exchanger according to claim 1, wherein a surface of the drainage plate on a side on which the concave grooves are opened contacts the pipe end openings of the heat absorbing pipes.

* * * * *